HIGH PRESSURE VALVE ASSEMBLY

Original Filed June 27, 1960 4 Sheets-Sheet 1

INVENTOR
ANTHONY J. WAIBEL
BY
HIS ATTORNEY

HIGH PRESSURE VALVE ASSEMBLY

Original Filed June 27, 1960 4 Sheets-Sheet 2

INVENTOR
ANTHONY J. WAIBEL
BY
HIS ATTORNEY

HIGH PRESSURE VALVE ASSEMBLY

Original Filed June 27, 1960 4 Sheets-Sheet 3

INVENTOR
ANTHONY J. WAIBEL
BY
HIS ATTORNEY

INVENTOR
ANTHONY J. WAIBEL
BY
HIS ATTORNEY

United States Patent Office

Re. 25,899
Reissued Nov. 9, 1965

25,899

HIGH PRESSURE VALVE ASSEMBLY

Anthony J. Waibel, Painted Post, N.Y., assignor to Ingersoll-Rand Company, New York, N.Y., a corporation of New Jersey Original No. 3,077,899, dated Feb. 19, 1963, Ser. No. 38,814, June 27, 1960. Application for reissue Feb. 18, 1965, Ser. No. 454,227
11 Claims. (Cl. 137—512)

Figure 1:
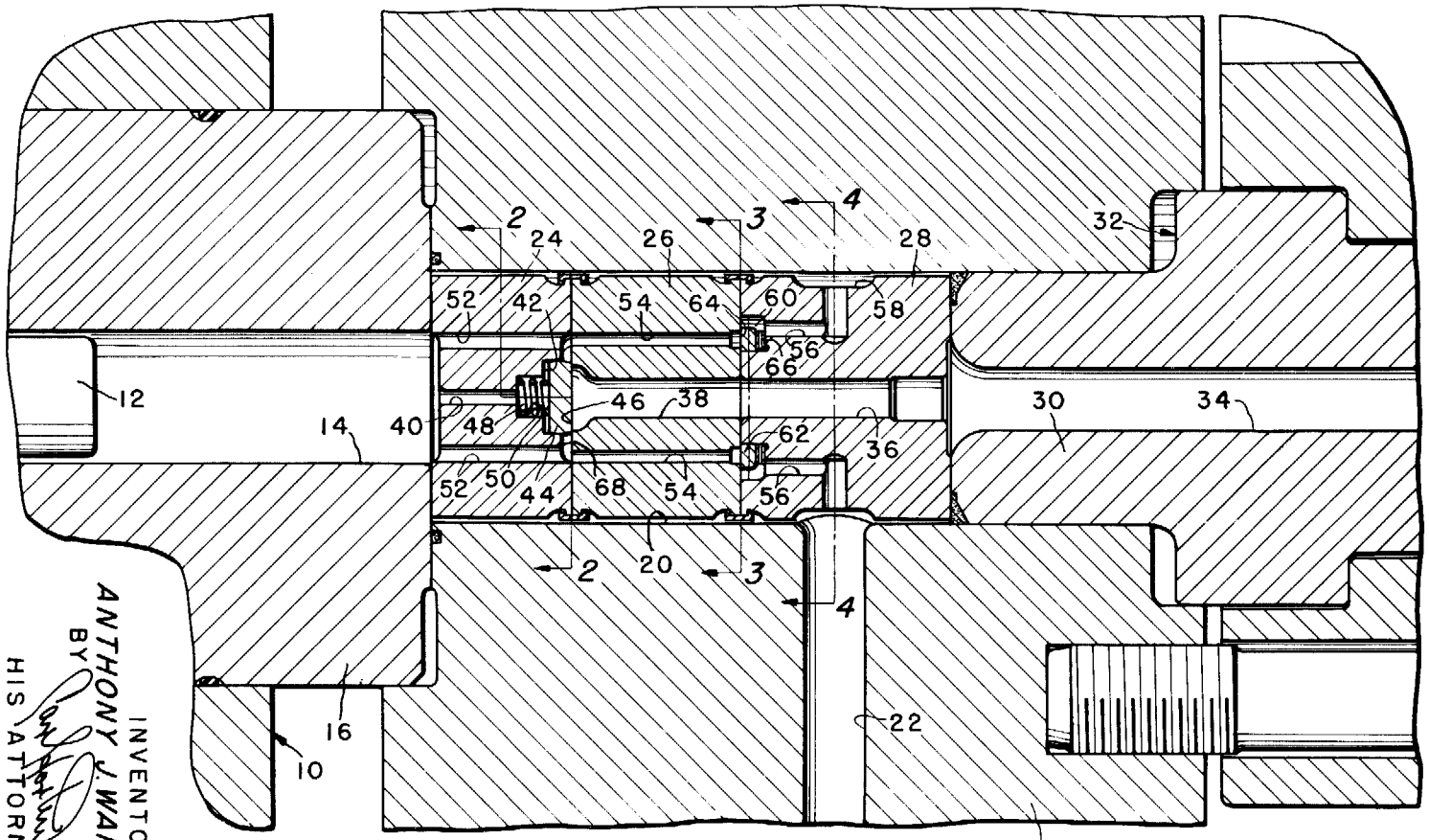

Matter enclosed in heavy brackets [ ] appears in the original patent but forms no part of this reissue specification; matter printed in italics indicates the additions made by reissue.

*This is a reissue application of U.S. Patent No. 3,077,-899, issued to A. J. Waibel on February 19, 1963.* This invention relates to valve assemblies and more particularly to a high pressure valve assembly for compressors or the like and used for the control of the flow of a fluid under substantially high pressure.

In a high pressure valve assembly the material of the components through which fluid under high pressure is conducted is subjected to repeated stresses of high magnitude with each revolution of the compressor.

In the commonly known types of high pressure valve assemblies the structure is such that the high pressure discharge is conducted through the central portion of the assembly while the lower pressure inlet is conducted through the side of the assembly, causing the assembly to be subjected to internal pressure, resulting in tension of the material. This leads to early fatigue and failure of the material when the pressure differential between the discharge and the inlet is substantial.

When comparing the valve assembly with a hollow cylinder, it is commonly known that such a cylinder can withstand a higher external pressure than internal pressure before material failure. In view thereof the present invention provides a high pressure valve assembly in which the components of the assembly, through which fluid under high pressure is conducted, is subjected to compression as a result of external pressure to increase the life of the assembly and to eliminate the causes of material failure.

*The valve assembly includes a portion having passages for conducting the fluid to be compressed as well as the fluid after compression. As is common in reciprocating compressors, the pressure of the fluid in sections of these passages, the section downstream of the inlet valve, and the section upstream of the discharge valve, fluctuates from the inlet pressure to the pressure of the fluid after compression, the discharge pressure. This fluctuation of the pressure in the aforementioned sections will occur repeatedly with each stroke of the compressor piston. When no external pressure is applied to the exterior of that portion of the valve body through which the fluid of fluctuating pressure is conducted, the material of the said portion of the valve body will be subjected to repeated fluctuating tensile stresses and will fail within a relatively short time because of material failure in tension. When, however, an external pressure is applied to the said portion of the valve body, the tensile stresses in the material of the said portion of the valve body will be reduced, and if the force of the external pressure exerted on the exterior of the said portion of the valve body is made as great as or greater than the forces exerted on the interior of the said valve body, the tensile stresses in the material of the said portion of the valve body will be eliminated and the said portion of the valve body will be subjected to a balanced or compressive force, respectively.*

An object of this invention is to provide a high pressure valve assembly of simplified structure as compared to the presently known high pressure valve assemblies.

Another object of this invention is to provide a high pressure valve assembly in which the causes of failure and fatigue of the material are eliminated.

Still another object of this invention is to provide a high pressure valve assembly in which the life of the valve assembly is substantially increased.

Another object of this invention is to provide a high pressure valve assembly of such structure that will facilitate maintenance procedures.

A further object of this invention is to provide a high pressure valve assembly in which the inlet as well as the discharge is housed in a single unit.

Another object of this invention is to provide a high pressure valve assembly which is strong, reliable and effective.

Other objects will become apparent from the following description and accompanying drawings which illustrate preferred embodiments of the invention and in which similar numerals refer to similar parts.

FIGURE 1 is a longitudinal sectional view of a preferred embodiment of the valve assembly according to this invention.

Figure 2:
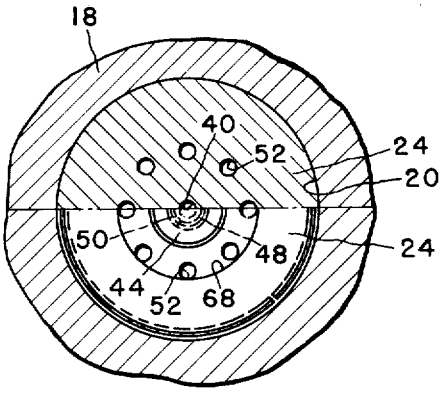
Figure 3:
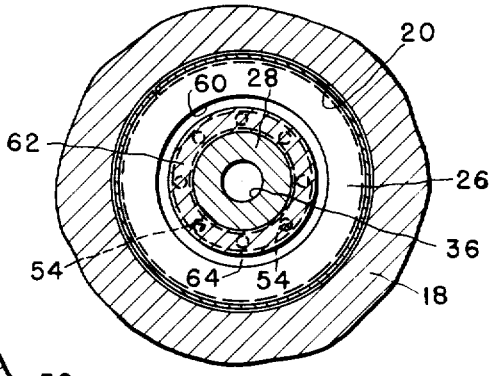
Figure 4:
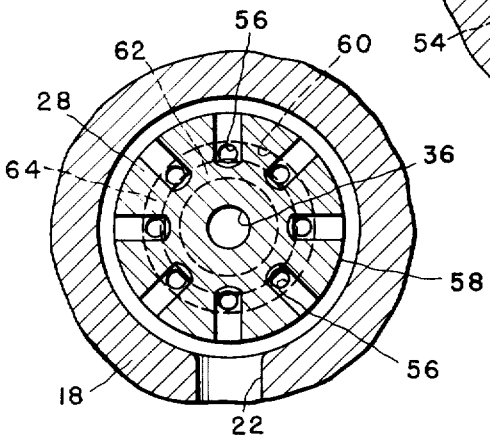

FIGS. 2, 3 and 4 are cross sectional views of FIG. 1 taken along the lines 2—2, 3—3 and 4—4, respectively, looking in the direction of the arrows.

Figure 5:
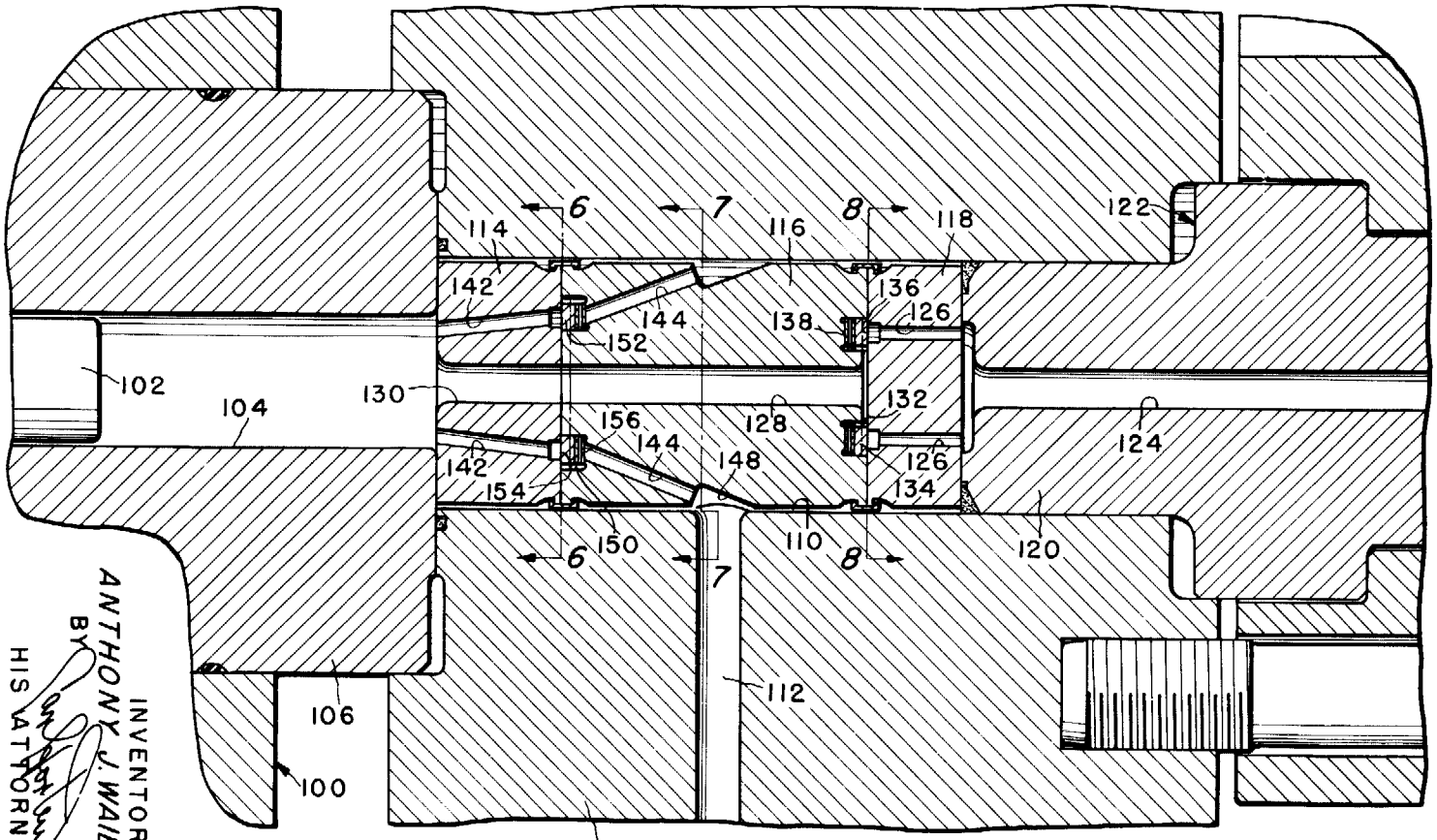

FIG. 5 is a longitudinal sectional view of another embodiment of the valve assembly according to this invention.

Figure 6:
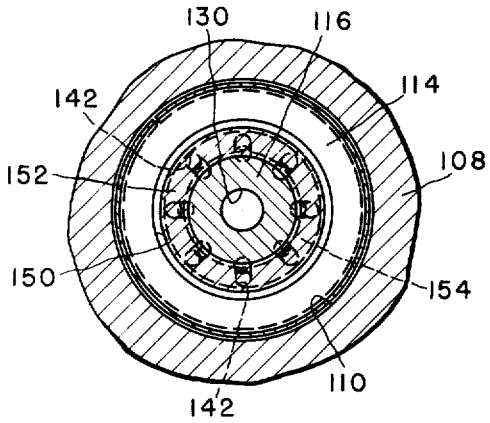
Figure 7:
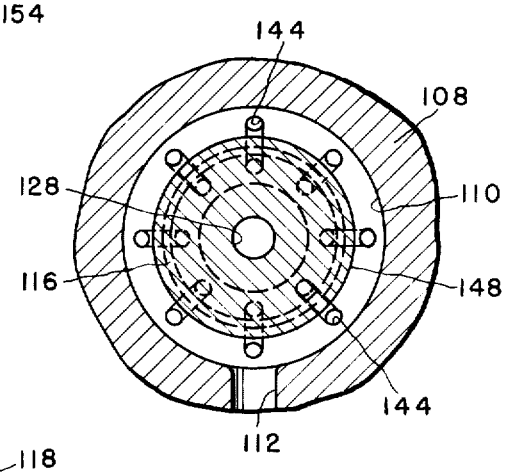
Figure 8:
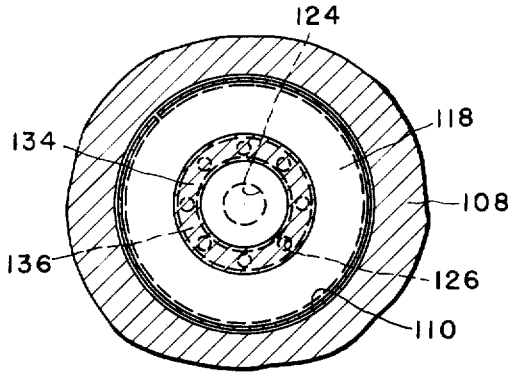

FIGS. 6, 7 and 8 are cross sectional views of FIG. 5 taken along the lines 6—6, 7—7 and 8—8, respectively, looking in the direction of the arrows.

Referring now to the drawings, FIGS. 1, 2, 3 and 4 illustrate a preferred embodiment of the invention in which 10 designates a high pressure compressor (partly shown) having a piston 12 (partly shown) reciprocating in a cylinder bore 14 of a cylinder 16 (partly shown).

Connected to the end of the cylinder 16 is provided the valve assembly according to this invention comprising an element 18 having a cylindrical bore 20 and a passage 22 laterally extending from the inner periphery of bore 20 through the wall of element 18. Passage 22 serves as a discharge passage for the conductance of fluid compressed in the compressor as will appear hereinafter.

Within the bore 20 are slidably disposed cylindrical members 24, 26 and 28, and the end portion 30 of an inlet member 32. The ends of the members 24, 26 and 28 are metal ground and sealingly abut each other, the members 24, 26 and 28 being clamped tightly between the inlet member end portion 30 and the cylinder 16 in a commonly known manner.

The inlet member 32 is provided with a centrally positioned longitudinal inlet passage 34 which is in communication with the cylinder bore 14 through passages 36, 38 and 40 centrally extending through the members 28, 26 and 24, respectively.

The passage 40 includes a recess 42 formed at the end of member 24 abutting the member 26, the recess 42 being adapted to house a valve 44 of a commonly known disc type. The valve 44 serves as a check valve to permit flow of fluid from the inlet passage 34 into the cylinder bore 14, but preventing return flow of such fluid from the cylinder bore 14 into inlet passage 34. Accordingly, valve 44 seats on a valve seat 46 positioned on the end surface of the seat member 26 abutting the member 24, the valve 44 being constantly urged onto the valve seat 46 by a spring 48 positioned in a spring chamber 50 which is also a portion of the passage 40.

Communication is formed between the cylinder bore 14 and the discharge passage 22 through a passage 52 in member 24, a passage 54 in member 26, a passage 56 and an annular peripheral undercut 58, both in member 28. The passages 52, 54 and 56, see FIGS. 2, 3 and 4, are formed by a plurality of passages positioned radially displaced from the central passages 40, 38 and 36, respectively. The passage 56 includes a ring-shaped recess 60 formed at the end of member 28 abutting the member 26, the recess 60 being adapted to house a valve 62 of a commonly known ring type. The valve 62 serves as a check valve to permit flow of fluid from the cylinder bore 14 into the discharge passage 22, but preventing return flow of fluid from discharge passage 22 into cylinder bore 14. Accordingly, valve 62 seats on a valve seat 64 positioned on the end surface of the seat member 26 abutting the member 28, valve 62 being constantly urged onto valve seat 64 by a spring 66 positioned in recess 60.

It is to be noted that recess 42 is in communication with passages 52 and 54 through an annular recess 68, the purpose thereof to appear hereinafter.

Referring now to the operation of the valve assembly according to this invention, when piston 12 is reciprocated, fluid to be compressed is admitted from inlet passage 34 into the cylinder bore 14 and compressed therein, whereafter the compressed fluid is discharged through discharge passage 22. The suction stroke of piston 12 causes valve 44 to open, permitting fluid to flow from inlet passage 34 through passages 36, 38 and 40 into cylinder bore 14. The inlet fluid can also flow from passage 38 into recess 68 and passage 52 into cylinder bore 14. After the fluid is compressed by piston 12 on its compression stroke, the fluid flows through passages 52 and 54, forcing valve 62 to open, whereafter the fluid flows into recess 60, passage 56, undercut 58 and into discharge passage 22. It is to be noted that passage 40, communicating cylinder bore 14 with recess 42, serves to permit inlet fluid to flow from passage 38 into cylinder bore 14 at the suction stroke of piston 12, and also, to insure that the discharge fluid will force valve 44 into closed position at the compression stroke of piston 12.

As the members 24, 26 and 28 are slidably disposed in bore 20 of element 18, the discharge fluid in the peripheral undercut 58 is permitted to flow into the clearance between the outer periphery of the members 24, 26 and 28 and the inner periphery of bore 20 to exert a pressure on the exterior of the members 24, 26 and 28 equal to the discharge pressure.

The total force of the discharge fluid exerted on the outer periphery of members 24, 26 and 28 being substantially greater than the total force of the inlet and discharge fluid in the central portion of the members 24, 26 and 28 during the suction stroke as well as during the compression stroke of piston 12 causes the members 24, 26 and 28 to be subjected to external pressure whenever the compressor is in operation, a distinct feature of this invention as hereinbefore explained.

Another feature of this invention is the arrangement of the members 24, 26 and 28 with respect to the location of the valve seats 64 and 46. It is to be observed that both valve seats 64 and 46 are positioned at the ends of only one member, of seat member 26, the advantages of this arrangement being a simplification of manufacturing the assembly and simplification of maintenance procedures in cases of reconditioning or replacement of the components of the valve assembly.

Yet another feature of this invention, the arrangement of the inlet passage relative to the discharge passage to achieve the external pressure feature, is that whenever it is required to disassemble the valve assembly, the discharge line connection (not shown) to the discharge passage 22 can remain undisturbed, eliminating the risks of leakage at reassembly of such discharge line connection.

Another embodiment of the valve assembly according to this invention is illustrated in FIGS. 5, 6, 7 and 8 in which 100 designates a high pressure compressor (partly shown) having a piston 102 (partly shown) reciprocating in a cylinder bore 104 of a cylinder 106 (partly shown). An element 108, connected to the end of cylinder 106, is provided with a cylindrical bore 110 and a passage 112 laterally extending from the inner periphery of bore 110 through the wall of element 108. Passage 112 serves as a discharge passage for the conductance of fluid compressed in the compressor as will appear hereinafter.

Within the bore 110 are slidably disposed cylindrical members 114, 116 and 118, and the end portion 120 of an inlet member 122. The ends of the members 114, 116 and 118 are metal ground and sealingly abut each other, the members 114, 116 and 118 being clamped tightly between the inlet member end portion 120 and the cylinder 106.

The inlet member 122 is provided with a centrally positioned longitudinal inlet passage 124 which is in communication with the cylinder bore 104 through passages 126, 128 and 130 centrally extending through the members 118, 116 and 114, respectively. Passage 126, see FIG. 8, is formed by a plurality of passages arranged radially displaced relative to passages 124 and 128.

The passage 128 includes a recess 132 formed at the end of member 116 abutting the member 118, the recess 132 adapted to house a valve 134 of a commonly known ring type. The valve 134 serves as a check valve to permit flow of fluid from the inlet passage 124 into the cylinder bore 104, but preventing return flow of such fluid from the cylinder bore 104 into inlet passage 124. Accordingly, valve 134 seats on a valve seat 136 positioned on the end surface of member 118 abutting member 116, the valve 134 being constantly urged onto valve seat 136 by a spring 138 positioned in the recess 132.

Communication is formed between the cylinder bore 104 and discharge passage 112 through a passage 142 in member 114, a passage 144 in member 116, and an annular peripheral undercut 148 also in member 116. Passages 142 and 144, see FIGS. 6 and 7, are formed by a plurality of passages arranged radially displaced from the central passages 130 and 128, respectively. The passage 144 includes a recess 150 formed at the end of member 116 abutting member 114, the recess 150 adapted to house a valve 152 of a commonly known ring type. The valve 152 serves as a check valve to permit flow of fluid from the cylinder bore 104 into discharge passage 112, but preventing return flow of fluid from discharge passage 112 into cylinder bore 104. Accordingly, valve 152 seats on a valve seat 154 positioned on the end surface of member 114 abutting the member 116, valve 152 being constantly urged onto valve seat 154 by a spring 156 positioned in recess 150.

Referring now to the operation of the valve assembly, the suction stroke of piston 102 causes valve 134 to open, permitting fluid to flow from inlet passage 124 through passages 126, 128 and 130 into cylinder bore 104. After the fluid is compressed by piston 102, the fluid flows through passage 142 forcing valve 152 to open and continues flowing into recess 150, through passage 144, undercut 148 and into discharge passage 112.

It is to be observed that with the structure of this embodiment of the valve assembly as shown in FIGS. 5, 6, 7 and 8, the arrangement of the conductance of the inlet and discharge fluid will permit the discharge fluid in the peripheral undercut 148 to flow into the clearance between the outer periphery of the members 114, 116 and 118 and the inner periphery of bore 110, with the result as explained in connection with the embodiment of the valve assembly shown in FIGS. 1, 2, 3 and 4: A valve assembly with the distinctive feature of being subjected to external pressure.

While I have shown and described specific forms of my invention, it is to be understood that various changes and modifications may be made without departing from the spirit of the invention as set forth in the appended claims.

I claim:

1. A valve assembly comprising, an element having a bore therethrough, a first closure for one end of said bore having a passage extending longitudinally therethrough, a second closure for the other end of said bore having a passage extending longitudinally therethrough, a seat member disposed in said bore having one end defining a first valve seat and the other end defining a second valve seat, a first member disposed in said bore positioned sealingly abutting between said first closure and said seat tioned sealingly abutting between said second closure and member, a second member disposed in said bore posi- said seat member, said members being disposed in said bore in close spaced relationship to the surface of said bore and cooperating with each other to define a valve body positioned within said bore, a first passage through said members positioned for communicating the passage in said first closure with the passage in said second closure, a first recess formed between the abutting ends of said second member and said seat member at said second valve seat positioned to form a portion of said first passage, a passage in said element extending from the inner periphery of said bore at the side of one of said members, a second passage through at least one of said members positioned for communicating said passage in said element with said passage in said second closure, a second recess formed between the abutting ends of said first member and said seat member at said first valve seat positioned to form a portion of said second passage, a first check valve positioned within said valve body and in said first recess adapted to seat on said second valve seat to permit flow of fluid from said first closure passage into said second closure passage and to prevent return flow of fluid from said second closure passage into said first closure passage, and a second check valve positioned within said valve body and in said second recess to seat on said first valve seat to permit flow of fluid from said second closure passage into said passage in said element and to prevent return flow of fluid from said passage in said element into said second closure passage.

2. The valve assembly claimed in claim 1 in which said first passage is positioned axially of said members, and said second passage comprises a plurality of passages positioned radially displaced from said first passage.

3. The valve assembly claimed in claim 1 in which said first valve is of a ring type, said second valve being of a disc type.

4. A valve assembly comprising, an element having a bore therethrough, a first closure for one end of said bore having a passage extending longitudinally therethrough, a second closure for the other end of said bore having a passage extending longitudinally therethrough, a first seat member disposed in said bore having one end sealingly abutting said first closure and the other end provided with a first valve seat, a second seat member disposed in said bore having one end sealingly abutting said second closure and the other end provided with a second valve seat, an intermediate member disposed in said bore positioned sealingly abutting between said seat members having its ends cooperating with the associated ends of said seat members to form a first recess at said first valve seat and a second recess at said second valve seat, said members being disposed in said bore in close spaced relationship to the surface of said bore and cooperating with each other to define a valve body positioned within said bore, a first passage through said members positioned for communicating the passage in said first closure with the passage in said second closure, a passage in said element extending from the inner periphery of said bore at the side of one of said members, a second passage through at least one of said members positioned for communicating the passage in said element with the passage in said second closure, said first recess positioned to form a portion of said first passage, said second recess positioned to form a portion of said second passage, a first check valve positioned within said valve body and in said first recess of said first passage for seating on said first valve seat to permit flow of fluid from said first closure passage into said second closure passage and to prevent return flow of fluid from said second closure passage into said first closure passage, and a second check valve positioned within said valve body and in said second recess of said second passage for seating on said second valve seat to permit flow of fluid from said second closure passage into said passage in said element and to prevent return flow of fluid from said passage in said element into said second closure passage.

5. The valve assembly claimed in claim 4 in which the portion of said first passage in said second member and said intermediate member is positioned axially of said second member and said intermediate member, the portion of said first passage in said first member being a plurality of passages positioned radially displaced from the axis of said first member, the portion of said second passage in said second member and said intermediate member being a plurality of passages positioned radially displaced from said first passage in said second member and said intermediate member.

6. The valve assembly claimed in claim 4 in which said first and second valves are of a ring type.

7. A valve assembly comprising, a casing having a bore therethrough, a first closure for one end of said bore [having a passage leading from said bore for the conductance of fluid], a second closure for the other end of said bore having a passage leading from said bore for the conductance of fluid, a valve body disposed in said bore positioned in abutment against said first closure and said second closure to prevent longitudinal movement of said valve body in said bore, [said valve body having its entire outer periphery cooperating with the associated surface of said bore to define a close space between the valve body and the surface of said bore,] a discharge passage in the casing wall extending from said bore at the side of said valve body, a first passage in said valve body positioned to conduct fluid [from said passage in said first closure] to said passage in said second closure, a first valve seat formed in said first passage wholly within said valve body, a first valve positioned wholly within said valve body and cooperating with said first valve seat to control the flow of fluid through said first passage, a second passage in said valve body positioned to conduct fluid from said passage in said second closure to said discharge [conduit] *passage*, a second valve seat formed in said second passage wholly within said valve body, a second valve positioned wholly within said valve body and cooperating with said second valve seat to control the flow of fluid through said second passage, *said valve body having its outer periphery cooperating with the associated surface of said bore to define a close space between the valve body and the surface of said bore, said space surrounding at least that portion of the valve body containing said first and said second passages*, said second passage being in communication with the [entire] space between the valve body and the surface of said bore downstream from said second valve with respect to the flow of fluid to receive discharge fluid so as to constantly subject the entire outer periphery of said *portion of said* valve body to the pressure of the fluid in the portion of said second [conduit] *passage* downstream of said second valve.

8. The device claimed in claim 7 in which said valve body is positioned in said bore in sealing abutment with said first closure and said second closure.

*9. A high pressure valve assembly for a reciprocating compressor, comprising a casing having a bore, a valve body disposed in said bore, an inlet passage within said body running generally longitudinally of said body for the passage of fluid to the compressor, a discharge passage in said body running generally longitudinally of said body*

*for the passage of fluid discharged from the compressor, an inlet valve positioned wholly within said body and within said inlet passage for controlling the flow of gas under pressure into the compressor, a discharge valve located wholly within said body and within said discharge passage for controlling the flow of fluid discharged from the compressor, the external surface of said body and the internal surface of the bore of said casing being such that a confined space is formed encircling the portion of said body confining the sections of said passages containing fluid subject to cyclic pressure of discharge of the compressor, and means for supplying to said space fluid under pressure sufficient to maintain such portion of the body in compression at all times.*

*10. The valve assembly claimed in claim 9 in which said means comprises a passage leading to said chamber from the discharge passage at a point downstream of said discharge valve.*

*11. A high pressure valve assembly for a reciprocating compressor, comprising a casing having a bore, a valve body disposed in said bore, an inlet passage within said body running generally longitudinally of said body for the passage of fluid to the compressor, a discharge passage in said body running generally longitudinally of said body for the passage of fluid discharged from the compressor, a discharge valve positioned wholly within said body and within said discharge passage for controlling the flow of gas under pressure from the compressor, said body and the bore of said casing being formed to provide a pressure chamber overlying the entire periphery of the portion of said body containing the section of said discharge passage which is upstream of said discharge valve, and means for supplying fluid under pressure to said chamber sufficient to prevent substantially the material of said body portion from being subjected to a tensile stress resulting from pressure in such section of the discharge passage.*

References Cited by the Examiner

The following references, cited by the Examiner, are of record in the patented file of this patent or the original patent.

UNITED STATES PATENTS

| | | | |
|---|---|---|---|
| 999,220 | 8/11 | Harmon | 137—512.3 X |
| 1,057,089 | 3/13 | Prellwitz | 137—512 |
| 1,231,518 | 6/17 | Geisendorff | 137—512 |
| 1,708,158 | 4/29 | Steedman | 137—512 X |
| 2,628,866 | 2/53 | Purchas et al. | 137—512 X |
| 2,656,851 | 10/53 | Nichols | 137—512.1 |
| 2,670,172 | 2/54 | Moore | 251—367 X |

FOREIGN PATENTS

| | | |
|---|---|---|
| 989,569 | 5/51 | France. |
| 2,525 | 2/92 | Great Britain. |

M. CARY NELSON, *Primary Examiner.*

ALLEN J. JAFFE, *Examiner.*